United States Patent [19]

Fitzner

[11] 4,318,387

[45] Mar. 9, 1982

[54] EXTERNAL PULSE CONTROLLED SPARK ADVANCE UNIT FOR AN INTERNAL COMBUSTION ENGINE IGNITION SYSTEM

[75] Inventor: Arthur O. Fitzner, Fond du Lac, Wis.

[73] Assignee: Brunswick Corporation, Skokie, Ill.

[21] Appl. No.: 117,667

[22] Filed: Feb. 1, 1980

[51] Int. Cl.³ .................................................. F02P 5/04
[52] U.S. Cl. ...................................... 123/602; 123/415
[58] Field of Search ............... 123/414, 415, 416, 418, 123/602, 417

[56] References Cited

U.S. PATENT DOCUMENTS

| | | | |
|---|---|---|---|
| 3,874,349 | 4/1975 | Fitzner | 123/602 |
| 3,898,972 | 8/1975 | Haubner | 123/602 |
| 3,923,022 | 12/1975 | Scholl | 123/415 |
| 4,111,174 | 9/1980 | Fitzner et al. | 123/602 |
| 4,208,992 | 6/1980 | Polo | 123/415 |
| 4,244,336 | 1/1981 | Fitzner | 123/602 |

*Primary Examiner*—Raymond A. Nelli

*Attorney, Agent, or Firm*—Andrus, Sceales, Starke & Sawall

[57] ABSTRACT

A power unit (79) includes a spark advance unit (80) connected to a solid state ignition system (81) for selectively supplying ignition sparks to operate an internal combustion engine (83). A pulse generator (107) responds to a series of negative polarity half-cycle alternations (96) provided by an alternator winding (20') to provide a first pulse output (110) of a first frequency. A pulse counter (119) counts the pulses of the first pulse output (110) to provide a second pulse output (120) having a second frequency which is an exact fraction of the frequency of the first pulse output (110). A high speed and a low speed spark advance transfer unit each include a retriggerable monostable circuit (127, 136) coupled to a latch circuit (133, 142) to selectively operate a modifying circuit (145, 164) to provide control signals to the ignition system (81) to provide a rapid spark angle advance at preselected speeds.

3 Claims, 6 Drawing Figures

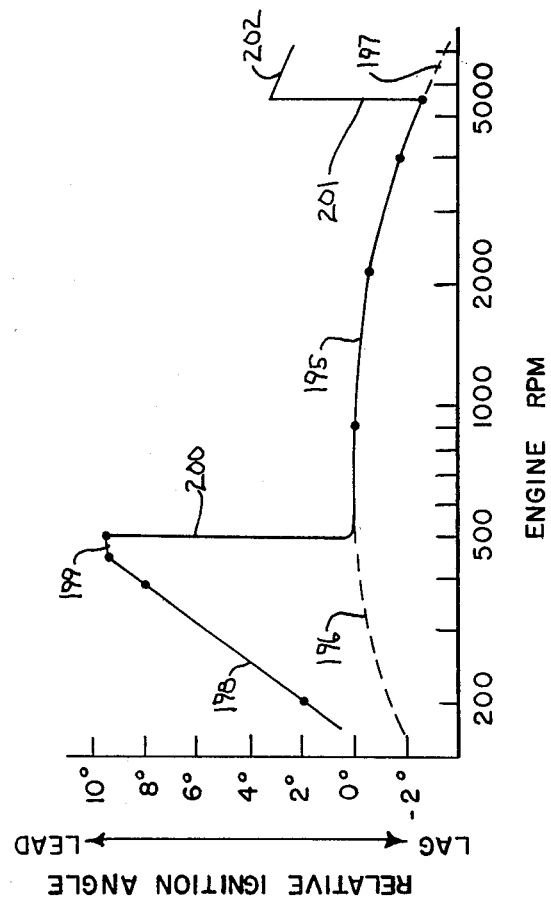
FIG. 4
FIG. 6
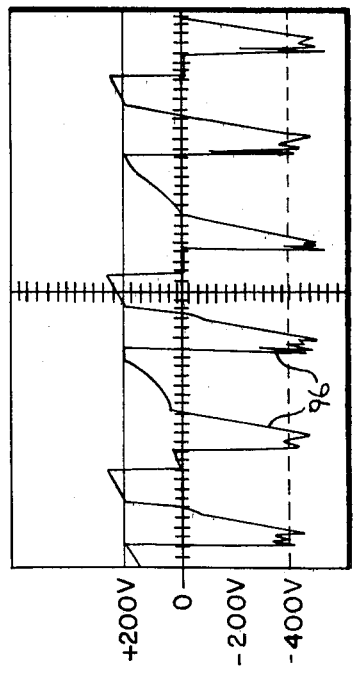
FIG. 1
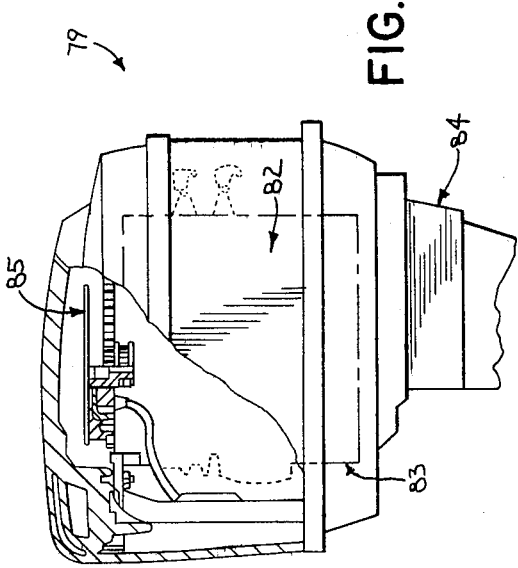
FIG. 5

EXTERNAL PULSE CONTROLLED SPARK ADVANCE UNIT FOR AN INTERNAL COMBUSTION ENGINE IGNITION SYSTEM

DESCRIPTION

1. Cross Reference to Related Applications

A portion of the apparatus and methods disclosed in this application are disclosed and/or claimed in the following concurrently filed applications:

Ser. No. 117,666, filed Feb. 1, 1980 in the name of Arthur O. Fitzner and entitled "High Speed Spark Advancer for an Internal Combustion Engine Ignition System".

Ser. No. 117,668, filed Feb. 1, 1980 in the name of Arthur O. Fitzner and entitled "Pulse Controlled Spark Advance Unit For An Internal Combustion Engine Ignition System".

2. Technical Field

The invention relates to a spark advance unit for a power unit including an ignition system connected to operate an internal combustion engine.

3. Background Art

One automatic spark timing advance system senses engine speed, such as by monitoring either the negative bias voltage applied to bias controlled rectifier circuitry used to control the spark angle or the high speed alternator winding output, for operating an auxiliary controlled rectifier to conduct opposite polarity pulses from the alternator to trigger the controlled rectifier circuitry to provide an advanced spark angle at higher speeds, such as provided in the application by Arthur O. Fitzner and entitled "Ignition System for Multiple Cylinder Internal Combustion Engines Having Automatic Spark Advance", which issued on Apr. 1, 1975 to U.S. Pat. No. 3,874,349 and is assigned to a common assignee herewith.

The U.S. Pat. No. 3,898,894, which issued on Aug. 12, 1975 and is entitled "Engine Ignition Timing Control", discloses a system for controlling ignition spark timing by modulating the pulse width of a pulse signal to provide ignition timing throughout the varying operating conditions of the engine.

Another system employs a "bucket" type tachometer circuit connected to a pilot trigger capacitor to receive a pulse rate related charging signal to operate a field-effect transistor operating to vary the resistance at a timing stabilizing threshold bias capacitor to reduce the bias voltage for lowering the triggering threshold to automatically advance the spark at idle speeds, such as provided in the application by Arthur O. Fitzner and entitled "Ignition System with Idle Speed Governor Apparatus", which issued on Jan. 4, 1977 to U.S. Pat. No. 4,111,174 and is assigned to a common assignee herewith.

Another prior spark timing advance senses a plurality of pulses provided by the alternator low speed winding during each cycle of the ignition system operation to vary the negative bias voltage which biases the controlled rectifier circuitry to provide an advanced spark angle limited to low speeds, and wherein the high speed winding is lightly loaded and provides essentially undistorted signals at such low speeds, such as provided in the application by Arthur O. Fitzner and entitled "Low Speed Limiter Unit for Internal Combustion Engine Ignition Systems", which issued on Jan. 13, 1981 to U.S. Pat. No. 4,244,336 and assigned to a common assignee herewith.

DISCLOSURE OF INVENTION

An improved spark advance unit is connected to a power unit including a solid state ignition system which selectively supplies ignition sparks to operate an internal combustion engine. A counter is operatively connected to count speed indicative pulses provided by a power unit circuit to provide an output signal to the ignition system in response to a predetermined frequency of pulses to rapidly advance the spark angle at a predetermined speed. A first pulse generator is operatively connected to the power unit circuit to provide a first pulse output of a first frequency in direct response to the speed indicative pulses. The counter is connected to the pulse generator to count the pulses of the first output and to generate a second output pulse for a predetermined number of first output pulses, whereby the frequency of the second output pulses is a fractional part of the frequency of the first output pulses. A first circuit including a retriggerable monostable circuit provides a first control signal to the ignition system to rapidly advance the spark angle within a predetermined low speed range in response to the first pulse output. A second circuit including a retriggerable monostable circuit provides a second control signal to the ignition system to rapidly advance the spark angle within a predetermined high speed range in response to the second pulse output.

BRIEF DESCRIPTION OF THE DRAWINGS

FIG. 1 is a simplified view of an outboard motor for a boat with parts broken away to generally show inner details of construction;

FIG. 4 is a graphical illustration of the wave form sensed at the high speed winding of the alternator illustrated in FIG. 2 at high speeds;

FIG. 5 is a graphical illustration of gating signals employed to actuate a controlled rectifier to provide an ignition spark and having an ordinate representing voltage and an abscissa representing relative ignition angle; and FIG. 6 is a graphical illustration of an electronic timing characteristic and having an ordinate showing the relative ignition angle and an abscissa showing the engine speed in revolutions per minute (RPM).

BEST MODE FOR CARRYING OUT THE INVENTION

Figure 2:
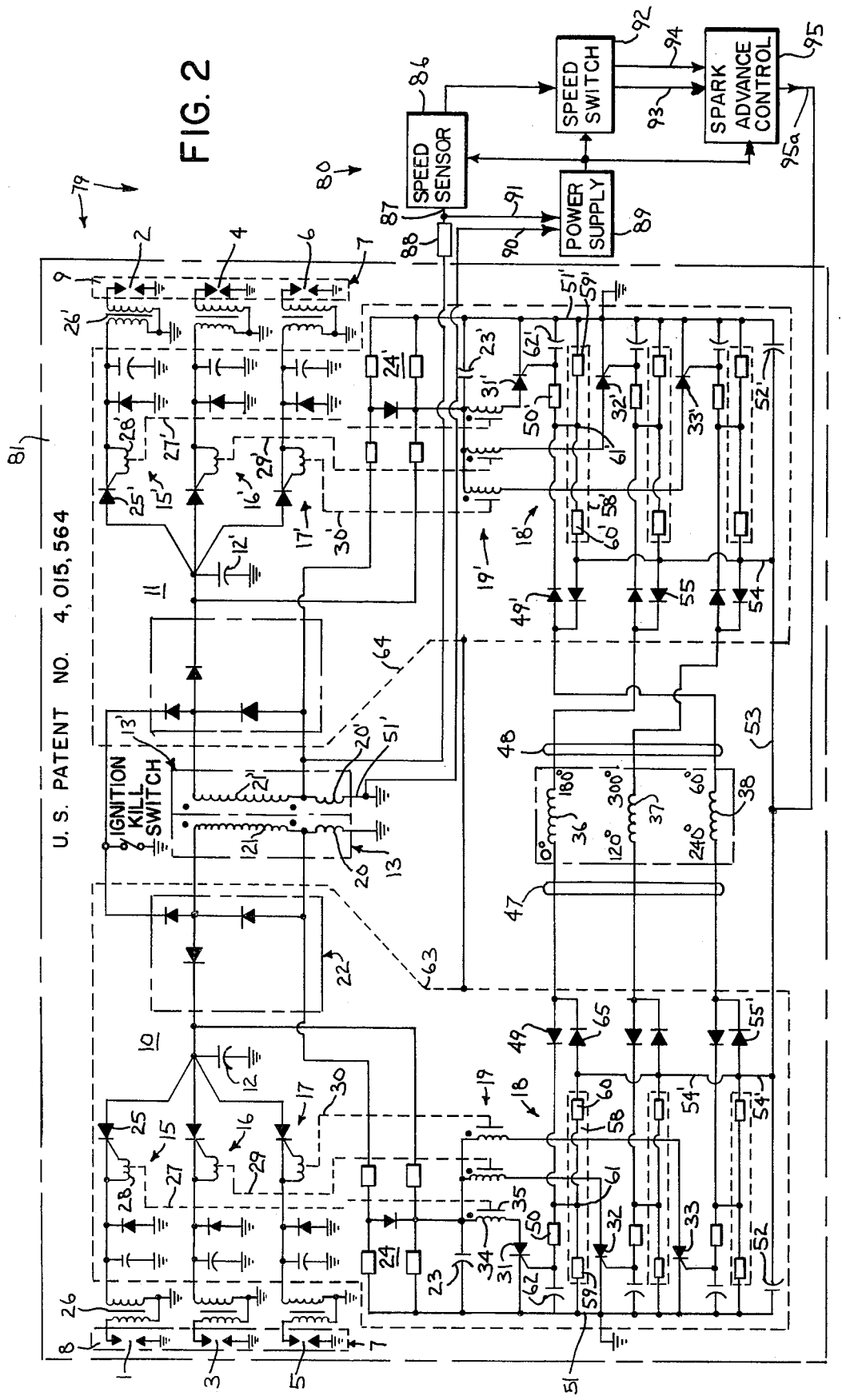
FIG. 2 is a block diagram illustrating a spark advance unit and a schematic circuit showing one type of an alternator driven ignition system for a six cylinder, two cycle high horsepower outboard motor.

A power unit 79 includes a spark advance unit 80 connected to an alternator-driven ignition system 81 to supply ignition pulses to the combustion chambers 82 of an internal combustion engine 83 operating as part of an outboard motor 84. A flywheel type alternator 85 on outboard motor 84 is driven by engine 83 to rotate and generate an output providing both energizing power and timing signals to the ignition system 81. The ignition system 81 may comprise any one of a number of different types of ignition systems. The capacitive discharge ignition system 81 illustrated in FIG. 2 is more fully shown and described in U.S. Pat. No. 4,015,564 issued on Apr. 4, 1977, and assigned to a common assignee herewith. The various components of ignition system 81 are numbered in accordance with the numbering system provided in U.S. Pat. No. 4,015,564.

The spark advance unit 80 includes a speed sensor 86 having an input circuit 87 connected to the high speed winding 20' of alternator section 13' through an input resistor 88. The spark advance unit 80 includes a power supply 89 having an input circuit 90 connected to the system neutral circuit 51' and a second input 91 connected to the alternator winding 20' through the input resistor 88.

A speed switch 92 responds to the output of speed sensor 86 to provide first and second speed responsive outputs at connecting circuits 93 and 94, respectively, to control the operation of a spark advance control 95. Under certain prescribed conditions, as set forth more fully hereinafter, the spark advance control 95 selectively varies the reverse-bias voltage maintained at the biasing capacitors 52 and 52' in the ignition system 81 via the connecting circuit 95a to rapidly change the ignition angle at preselected speeds.

The alternator section 13' is constructed to provide six voltage alternations 96, as illustrated in FIG. 4, for each complete cycle of operation of the ignition system 81. The power supply 89 responds to the negative polarity half-cycles of the alternations 96 to provide operating power to the various circuits of the spark advance unit 80.

Figure 3:
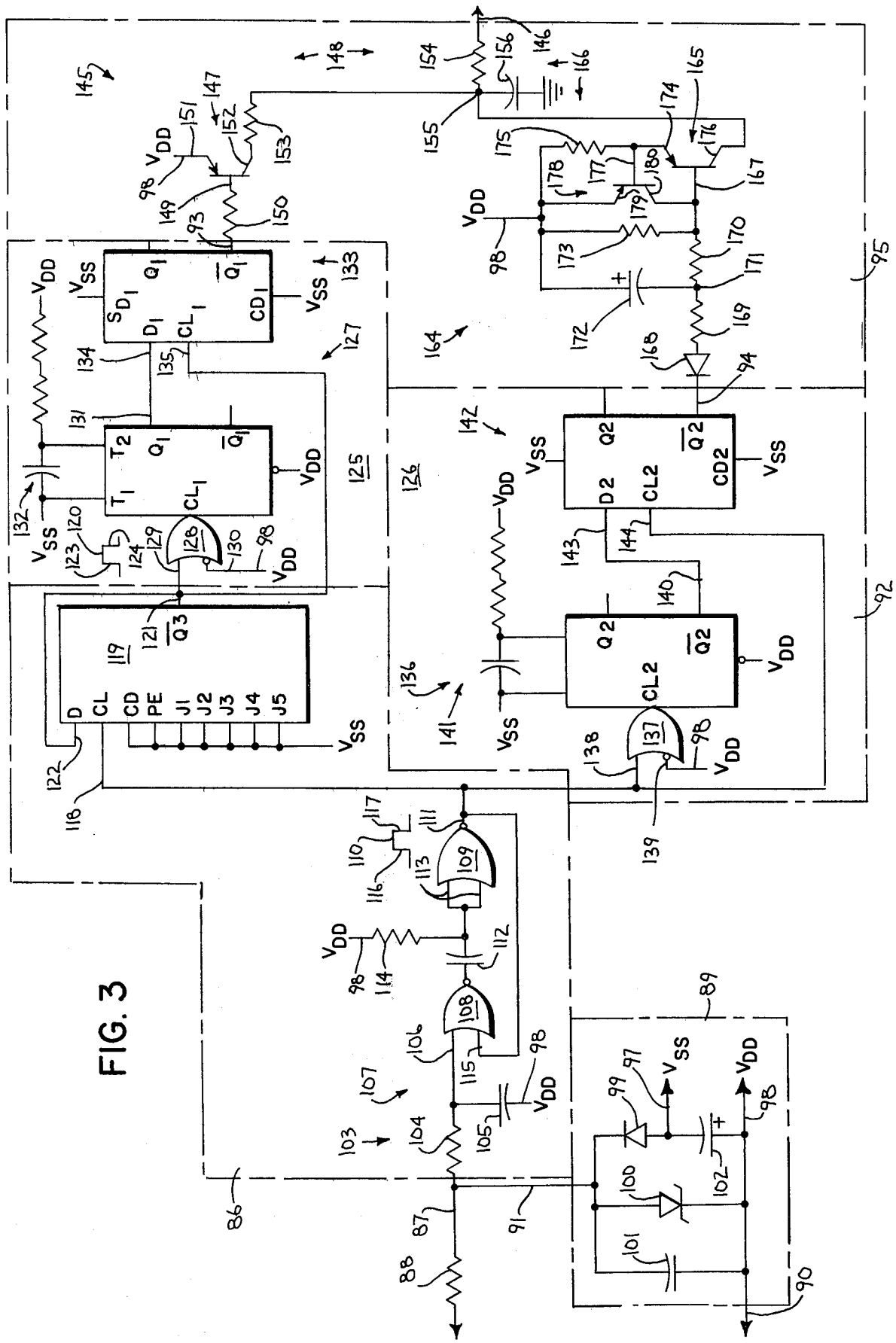
FIG. 3 is a circuit schematic showing the spark advance unit of FIG. 2.

With reference to FIG. 3, the series of alternations 96 supplied through the connecting resistor 88 are rectified and stabilized to provide a negative, substantially constant, D.C. voltage ($V_{SS}$) at a connecting circuit 97. The power supply 89 also provides a connecting circuit 98 joined to the system neutral circuit 90 to supply a system neutral ($V_{DD}$). For logic circuit purposes, the voltage $V_{SS}$ shall be regarded as a logic "0" level while the voltage $V_{DD}$ shall be regarded as a logic "1" level.

The conversion of the alternations 96 into stabilized reference signals capable of functioning with standard logic elements is provided by a rectifying diode 99, a Zener diode 100, and a pair of stabilizing capacitors 101 and 102, with capacitor 101 serving to filter high frequency transients accompanying the alternations 96 which appear at the input of resistor 88, and with capacitor 102 serving as a conventional D.C. power supply ripple filter/energy storage capacitor. The plurality of alternations 96 occurring every engine operating cycle are sufficient to maintain a substantially constant voltage across capacitor 102.

The speed sensor 86 provides an additional filter 103 for conducting any residual high frequency transients at input 87 to the system neutral circuit 98 and includes an input resistor 104 and a filtering capacitor 105. Each negative half-cycle 96 which is filtered and which appears at input circuit 87 is supplied by the filtering circuit 103 to an input circuit 106 of a pulse generator 107.

A pair of NOR logic circuits 108 and 109 are interconnected in closed loop configuration to provide a narrow rectangular pulse, such as illustrated by waveform 110, at an output circuit 111 in response to each negative polarity half-cycle of the alternations 96. The NORs 108 and 109 may comprise standard CMOS gates provided by any one of a number of commercially available sources, such as by RCA under the designation CD 4001 BE for example. The specific circuitry of pulse generator 107 is set forth in RCA Application Note ICAN-6267.

The NOR 108 responds to logic "0" signals at both inputs in the presence of a negative half-cycle of alternation 96 to provide a logic "1" signal to a capacitor 112. The capacitor 112 is connected to both inputs 113 of NOR 109 and to the system neutral circuit 98 through a resistor 114. In the presence of a negative half-cycle of alternation 96, inputs 113 are at logic "1" and NOR 109 provides a logic "0" signal to the output circuit 111 and to the input 115 of NOR 108. The disappearance of the negative half-cycle of alternation 96 provides a logic "1" signal to input 106. NOR 108 responds to the logic "1" input to provide a logic "0" signal to capacitor 112, which is coupled to inputs 113 of NOR 109. NOR 109 responds to the logic "0" signal at its inputs 113 to provide a logic "1" signal at output 111. As the capacitor 112 recharges to a magnitude corresponding to a logic "1" level at inputs 113, NOR 109 responds to provide a logic "0" signal at output 111. In such manner, a narrow rectangular pulse 110 having a sharp transition in both forward edge 116 and trailing edge 117 is provided for each negative polarity half-cycle of alternation 96.

The output circuit 111 is connected to a clock input 118 of a divide-by-six counter 119 (frequently referred to as a divider). The divider 119 may comprise any appropriate counting circuit which responds to a predetermined number of pulses 110 at input 118 to selectively provide a logic pulse 120 at an output circuit 121, such as the one marketed by RCA under the designation CD 4018 BE. In the present system there are six pulses 110 for each complete cycle of ignition system operation, so the divider 119 is connected to provide a divide-by-six function requiring six consecutive pulses 110 at input 118 to provide a single logic pulse 120 at output 121. With the counter 119 connected as shown in FIG. 3, the signal on output 121 will remain at the logic "0" level until transition 116 of the third consecutive pulse 110 occurs, at which time the signal on output 121 will become a logic "1" via transition 123. The signal on output 121 will remain at the logic "1" level until three more transitions 116 have occurred, at which time the signal on output 121 will become a logic "0" via transition 124. The signal on output 121 will continue to switch back and forth, making the transfer to the opposite logic polarity on every third consecutive transition 116 accompanying the series of pulses 110. The signal on output 121 will thus be of square wave shape, having only one transition 123 for each sequence of six of the transitions 116.

The speed switch 92 includes a high speed section 125 connected to selectively supply an output through the connecting circuit 93 in response to sensed logic pulses 120 provided at output 121 of divider 119 and a low speed section 126 connected to selectively supply an output through the connecting circuit 94 in response to sensed pulses 110 provided at output 111 of pulse generator 107.

The high speed section 125 includes a retriggerable monostable unit 127 including an input gate 128 providing a non-inverting input circuit 129 connected to output 121 of divider 119 and an inverting input circuit 130 connected to the logic "1" reference circuit 98. The leading edge 123 of pulse 120 triggers the monostable 127 to initiate its timing sequence. Upon the occurrence of a logic "1" at input 129 via the leading edge 123 of pulse 120, a Q1 output 131 of monostable 127 will maintain a logic "1" signal for a predetermined time dependent upon the time constant provided by an R-C timing circuit 132.

If the engine 83 is operating at a speed within a predetermined high speed range, such as at 5500 RPM for example, the pulse generator 107 will provide a predetermined number of pulses 110 for each unit of time, such as 33,000 pulses per minute for example. During each such unit of time, the divider 119 will respond to the predetermined number of pulses 110 to provide a predetermined number of pulses 120, such as 5500 for example. With the engine 83 operating within the predetermined high speed range, the transitions 123 of successive pulses 120 occur within the time period provided by the timing circuit 132 of monostable 127. When thus operating within the predetermined high speed range, the monostable 127 is unable to time out and maintains a steady logic "1" signal at output 131.

A latch 133 has a D1 input 134 connected to the Q1 output 131 provided by monostable 127. With a logic "1" signal at input 134, the leading edge 123 of a pulse 120 at a clock input 135 will clock the latch 133 to provide a logic "0" signal at an output connected to the output circuit 93. The latch 133 functions as a memory unit which is periodically updated by the leading edges 123 of the pulses 120.

If the operating speed of engine 83 decreases below the predetermined high speed range, such as below 5500 RPM for example, the monostable 127 will time out between succeeding leading edges 123 and transfer its Q1 output 131 to a logic "0". Upon the occurrence of the leading edge 123 of the next succeeding pulse 120, the latch 133 is clocked to accept and store the logic "0" signal at input 134, and thus transfer and provide a logic "1" signal to the output circuit 93.

A logic "0" signal is thus provided at output 93 by the high speed section 125 in response to the operation of engine 83 within the predetermined high speed range, such as at or above 5500 RPM for example. A logic "1" signal is provided at output 93 by the high speed section 125 in response to the engine 83 operating below the predetermined high speed range.

The low speed section 126 includes a retriggerable monostable unit 136 including an input gate 137 having a non-inverting input circuit 138 connected to output 111 of the pulse generator 107 and an inverting input 139 connected to the logic "1" reference circuit 98. The leading edge 116 of pulse 110 triggers the monostable 136 to initiate its timing sequence. Upon the occurrence of a logic "1" at input 138 via the leading edge 116 of pulse 110, an output 140 of monostable 136 will maintain a logic "0" signal for a predetermined time dependent upon the time constant provided by an R-C timing circuit 141.

If the engine 83 is operating at a speed above a predetermined low speed range, such as above 495 RPM for example, the transitions 116 of successive pulses 110 occur within the time period provided by the timing circuit 141 of monostable 136. When operating at a speed above the predetermined low speed range, the monostable 136 is unable to time out and maintains a logic "0" signal at output 140.

A latch 142 has a D2 input 143 connected to the output 140 provided by monostable 136. With a logic "0" signal at input 143, the leading edge 116 of a pulse 110 at a clock input 144 will clock the latch 142 to provide a logic "1" signal at the output circuit 94. The latch 142 functions as a memory unit which is periodically updated by the edges 116 of the pulses 110.

If the engine 83 is operating at a speed within the predetermined low speed range, such as at 495 RPM for example, the monostable 136 will time out between successive edges 116 of pulses 110 and transfer its output 140 to a logic "1". Upon the occurrence of the leading edge 116 of the next succeeding pulse 110, the latch 142 is clocked to accept and store the logic "1" signal at input 143, and thus transfer to provide a logic "0" signal to the output circuit 94.

A logic "0" signal is thus provided at output 94 by the low speed section 126 in response to the operation of engine 83 within the predetermined low speed range, such as at or below 495 RPM for example. A logic "1" signal is provided at output 94 by the low speed section 126 in response to the engine 83 operating above the predetermined low speed range.

The monostable circuits 127 and 136 may be selected from any one of a number of commercial sources, and two such monostables (minus timing circuits 132 and 141) may be found in a single integrated circuit, such as provided by Motorola under the designation MC 14538 BCP for example. Likewise, the latches 133 and 142 may be selected from any one of a number of commercial sources, and two such latches may be found in a single integrated circuit, such as provided by RCA under the designation CD 4013 BE for example.

The spark advance control 95 includes a high speed spark advance modifying circuit 145 connected to respond to the logic at output 93 to selectively supply a modifying signal to the ignition system 81 through the connecting circuit 95a. Specifically, the modifying circuit 145 includes a switch 147 and a bias voltage modifying impedance 148. The switch 147 includes a PNP type transistor providing a base circuit 149 connected to the output 93 of the speed switch 92 through a connecting resistor 150. An emitter circuit 151 of transistor 147 is connected to the system neutral circuit 98 while a collector circuit 152 is connected to the output circuit 95a through the modifying impedance 148 including a pair of serially connected resistors 153 and 154. A junction 155 between resistors 153 and 154 is connected to the system neutral through a capacitor 156 to protect the transistor 147 from high voltage, high frequency transients.

The spark advance control 95 responds to an operating speed below the predetermined high speed range (but above the predetermined low speed range) to operatively disable the spark advance unit 80 from providing any operative influence upon the ignition system 81. Specifically, a logic "1" signal provided by speed switch 92 at output 93, which indicates an engine operation below the predetermined high speed range, is applied to base circuit 149 to render the transistor 147 turned off, i.e. non-conductive. In such manner, the modifying impedance 148 is operatively disconnected so as not to provide any operative influence on the reversebias voltage provided by the capacitors 52 and 52' within the ignition system 81.

On the other hand, the spark advance 95 responds to an operating speed within the predetermined high speed range to condition the ignition system 81 to provide a significant spark advance. In this regard, a logic "0" signal provided by speed switch 92 at output 93, which indicates an engine operation within the predetermined high speed range, is applied to the base circuit 149 to render the transistor 147 turned on, i.e. conductive. In such manner, the modifying impedance 148 is operatively connected to provide a modifying influence upon the reverse-bias voltage retained by capacitors 52 and 52' within the ignition system 81. Thus, an additional circuit connection is completed from the system neutral circuit 98 through the conducting transistor 147, resistors 153 and 154, and the connecting circuit 95a to the negative bias circuit 53 of ignition system 81. With transistor 147 conductive, the reverse bias voltage at circuit 53 is significantly reduced, such as by fifty percent for example, to provide a significant advance in the spark angle.

At operating speeds below the predetermined high speed range and above the predetermined low speed range, a gating signal 191 as illustrated in FIG. 5 appears sequentially in the gate circuits of the controlled rectifiers, such as at controlled rectifier 31' for example. The gating signal 191 which appears at 61' for example, constitutes a summation of the gating pulse, such as provided by the alternator winding 36 and directed to the controlled rectifier 31' for example, and the reverse bias voltage provided by the biasing capacitors 52 and 52'. When a predetermined forward voltage drop across the gate to cathode circuit of the controlled rectifier 31' occurs, such as 0.6 volts for example, controlled rectifier 31' is rendered conductive. Such conduction is illustrated in FIG. 5 as occurring at point 192 corresponding to an ignition firing angle of approximately minus two degrees lag ($-2°$), measured in a relative sense. The ignition at point 192 of the gating signal 191 occurs without any influence by the high speed spark advance unit 80 and is referred to as a normal firing angle.

When speed sensor 86 senses an operating speed within the predetermined high speed range, such as above 5500 RPM for example, the speed switch 92 activates the modifying circuit 145 of the spark advance control 95 to operatively connect the resistors 153 and 154 to modify the potential at the reverse bias capacitors 52 and 52'. Under such conditions, a modified gating signal 193 appears sequentially in the gate circuits of the controlled rectifiers. When the voltage of gating signal 193 appearing at 61' reaches a predetermined magnitude, such as 0.6 volts for example, the controlled rectifier 31' is rendered conductive. Such conduction is illustrated in FIG. 5 at point 194 corresponding to an ignition firing angle of approximately four degrees lead ($+4°$) measured in a relative sense which constitutes a significant advance in the spark angle for the ignition system 81.

FIG. 6 illustrates the relationship between the relative firing or spark angle as a dependent function of engine speed. It is understood, but not shown in any of the Figures, that the relative firing or spark angle is also dependent upon the actual angular orientation of the alternator windings 36, 37 and 38. The windings 36, 37 and 38 are mounted in a common movable assembly (not illustrated) which when rotated in a direction opposite to the direction of rotation of the flywheel causes the gating signals as illustrated in FIG. 5 to occur earlier in the rotational movement of the engine crankshaft. Rotation of the windings in an opposite direction causes a timing or spark retard.

The circuit of the invention superimposes an advance of the spark angle on the spark angle that would have existed without the invention. FIG. 6 illustrates the electronically superimposed spark advance. The portion of the curve labeled 195 and the dashed extensions thereto labeled 196 and 197 illustrate a relative firing or spark angle characteristic as a function of engine speed that would exist without the invention and without any angular movement of alternator windings 36, 37, 38. The effect of the invention is to change the shape of the characteristic from 196, 195 and 197 to 198, 199, 200, 195, 201 and 202.

When engine 83 operates within the high speed range, such as at or above 5500 RPM for example the spark advance control 95 is operative to provide a significantly advanced spark angle as illustrated at 202. When engine 83 decreases its operating speed to a speed below the high speed range, the spark advance unit 80 disables its high speed spark advance circuit 145 and the firing or spark angle returns to its normal or customary spark angle as illustrated at 195 in FIG. 6.

The transition between the high speed advanced spark angle 202 for operation within the high speed range to the normal or customary spark angle 195 when the engine speed decreases below the high speed range is significantly rapid to provide a substantially instantaneous transition, as illustrated at 201 in FIG. 6. Thus when the operating speed of engine 83 decreases below the predetermined high speed range, a substantially instantaneous transition 201 occurs and the electronically superimposed spark angle rapidly transfers from an advanced sprak angle, such as approximately four degrees for example, to a normal spark angle, such as a minus two degrees for example, in response to the operation of the high speed spark advance circuit 145. If the engine 83 is operating under an overloaded condition or if the power output at wide open throttle decreases such that the engine speed drops below the predetermined high speed range, the spark advance unit 80 rapidly restores the spark angle to the normal operating value, as illustrated at 195 in FIG. 6, to prevent detonation.

At high speeds, the spark advance unit 80 operatively responds to only a single control pulse 120 for each operating cycle of engine 83. The use of only a single control pulse 120 provides an accurate and reliable transition 201. During high speed operations, the alternations 96 provided by the high speed winding 20' become heavily and unevenly loaded to produce six (6) somewhat unevenly spaced negative half cycles during each cycle of operation. The response by the spark advance unit 80 to only a single pulse 120, as provided by divider 119, during each operating cycle of the ignition system 81 provides an accurate and reliable transition, as illustrated at 201, to disable the high speed spark advance when sensed engine speed decreases below the predetermined high speed range thereby preventing detonation.

The spark advance control 95 also includes a low speed spark advance circuit 164 connected to respond to the signal at output 94 to selectively supply a modifying signal to the ignition system 81 through the connecting circuit 95a. Specifically, the modifying circuit 164 includes a switch 165 and a bias voltage modifying impedance 166. The switch 165 includes a PNP type transistor providing a base circuit 167 connected to the output 94 of the speed switch 92 through a diode 168 and two serially connected resistors 169 and 170. A junction 171 between resistors 169 and 170 is connected to the system neutral circuit 98 through a capacitor 172. The base circuit 167 of transistor 165 is also connected to the system neutral circuit 98 through a resistor 173. An emitter circuit 174 of transistor 165 is connected to the system neutral circuit 98 through a resistor 175 while a collector circuit 176 is connected to the output circuit 95a through the junction 155 and resistor 154.

When motor 83 operates at a speed within the predetermined low speed range, a logic "0" signal at output 94 will render transistor 165 turned on, i.e. rendered conductive. When transistor 165 conducts, a modifying circuit is operatively connected to the ignition system 81 to provide a low speed spark advance. Specifically, the modifying impedance 166 including resistors 175 and 154 is operatively connected to provide a modifying influence upon the reverse-bias voltage retained by capacitors 52 and 52' within the ignition system 81. Thus an additional circuit connection is completed from the system neutral circuit 98, resistor 175, conducting transistor 165, resistor 154 and connecting circuit 95a to the negative bias circuit 53 of ignition system 81. With transistor 165 conductive, the reverse bias voltage at circuit 53 is significantly reduced, such as by more than fifty percent for example, to provide a significant advance in the spark angle.

A base circuit 177 of a PNP type transistor 178 is connected to the emitter circuit 174 of transistor 165. The transistor 178 has an emitter circuit 179 connected to the system neutral circuit 98 and a collector circuit 180 connected to the base circuit 167 of transistor 165. The turn on of transistor 165 renders the transistor 178 conductive to provide a current limiting function to prevent damage to transistor 165.

When the speed sensor 86 senses an operating speed within the predetermined low speed range, such as below 495 RPM for example, the speed switch 92 activates the modifying circuit 164 of the spark advance control 95 to operatively connect the resistors 175 and 154 to modify the potential at the reverse bias capacitors 52 and 52'. In such sequence, a modified gating signal appears at the gate terminals of the controlled rectifiers to provide an ignition firing angle advance of approximately nine degrees lead (+9°) which constitutes a significant advance in the spark angle for the ignition system 81.

As illustrated in FIG. 6, the spark advance control 95 is operative to provide a significantly advanced spark angle when operating within the predetermined low speed range, as illustrated at 198 and 199 in FIG. 6. When the engine 83 increases its operating speed to a speed above the predetermined low speed range, the spark advance unit 80 disables its low speed spark advance circuit 164 and the firing or spark angle returns to a normal or customary angle as illustrated by the curve portion labeled 195 in FIG. 6.

At low speeds, the spark advance unit 80 operatively responds to each one of the six (6) control pulses 110 for each operating cycle of engine 83. The use of six pulses provides monitoring information to detect a possible low speed condition six times within each revolution of the flywheel. Thus, after only 1/6 revolution at an excessively low speed, i.e. within the predetermined low speed range, the spark advance control 80 is able to start responding with corrective action.

During low speed operations, the alternations 96 provided by the high speed winding 20' become very lightly loaded and produce six (6) negative half cycles having very even spacings, in contrast to the uneven spacings that exist at high speeds and which are shown in FIG. 4.

The transition between the normal or customary spark angle 195 and the low speed advanced spark angle 199 for operation within the low speed range is sufficiently concentrated to be plotted as a step change 200 in FIG. 6. That is, with only a very small change in speed the full spark advance as illustrated at 200 occurs.

However, while shown as being extremely rapid as a function of speed, the transition 200 is intentionally slowed as a function of time to reduce the roughness of engine idle.

The transition 200 is slowed as a function of time by the combination of diode 168, resistors 169, 170, 173, and capacitor 172. The voltage across resistor 173 builds up rapidly, but not instantaneously, when the engine speed drops within the predetermined low speed range. Conversely, the voltage across resistor 173 returns to zero somewhat less rapidly and again not instantaneously, when the engine speed rises out of the predetermined low speed range. The voltage across resistor 173 furnishes the turn-on drive for transistor 165. Resistor 175 also plays a role, inasmuch as its presence in the emitter circuit 174 of transistor 165 raises significantly the effective base circuit input impedance of transistor 165, thereby reducing the loading effect of the base input circuit 167 on the voltage developed across resistor 173.

Thus when the operating speed of motor 83 decreases to be within the predetermined low speed range, the potential for the full transition 200 occurs and the spark angle rapidly but in measured fashion transfers from a normal spark angle, such as approximately zero degress (0°) for example, to an advanced spark angle, such as approximately nine degrees lead (+9°) for example, in response to the low speed spark advance circuit 164. The low speed spark advance thus responds to the operation of the engine 83 within the predetermined low speed range to rapidly and significantly advance the spark angle to substantially reduce the possibility of engine stalling at low speeds.

I claim:

1. A power unit including a spark advance unit connected to a solid state ignition system selectively supplying ignition sparks to initiate combustion in an internal combustion engine, comprising
   (A) pulse generating means operatively connected to the power unit to provide during each cycle of operation of the power unit a first frequency pulse output and a second frequency pulse output indicative of the operating speed of the power unit,
   (B) and transfer means including a retriggerable monostable circuit operatively connected to said pulse generating means and to the ignition system to selectively transfer to rapidly advance the spark angle in response to said first pulse output corresponding to speeds within a first speed range and to selectively transfer to rapidly advance the spark angle in response to said second pulse output corresponding to speeds within a second speed range different than said first speed range.

2. A power unit including a spark advance unit connected to a solid state ignition system for selectively supplying ignition sparks to initiate combustion in an internal combustion engine, comprising
   (A) pulse generating means including
      (1) a first pulse generator connected to receive a plurality of speed indicative alternations from the ignition system during each cycle of the power unit operation to provide a first pulse output of a first frequency and
      (2) a second pulse generator operatively connected to respond to said first pulse output of said first pulse generator to provide a second pulse output of a second frequency different than said first frequency, and (B) transfer means operatively connected to the ignition system and to said pulse generating means and including (1) a first circuit including a first retriggerable monostable circuit connected to operatively respond to said first pulse output to provide a first control signal to the ignition system to rapidly advance the spark angle at speeds within a first predetermined speed range and (2) a second circuit including a second retriggerable monostable circuit connected to operatively respond to said second pulse output to provide a second control signal to the ignition system to rapidly advance the spark angle at speeds within a second predetermined speed range different than said first predetermined speed range.

3. The power unit of claim 2, wherein said first and second retriggerable monostable circuits each include a separate calibrating circuit selectively adjustable to independently calibrate each respective monostable circuit.

* * * * *

UNITED STATES PATENT AND TRADEMARK OFFICE
CERTIFICATE OF CORRECTION

PATENT NO. : 4,318,387
DATED : March 9, 1982
INVENTOR(S) : Arthur O. Fitzner

It is certified that error appears in the above-identified patent and that said Letters Patent is hereby corrected as shown below:

Column 8, line 25, "sprak" should read -- spark --.

Signed and Sealed this

Third Day of August 1982

[SEAL]

Attest:

GERALD J. MOSSINGHOFF

Attesting Officer    Commissioner of Patents and Trademarks